United States Patent
Deal et al.

(10) Patent No.: US 8,974,309 B2
(45) Date of Patent: Mar. 10, 2015

(54) VIDEO GAME PROCESSING APPARATUS AND VIDEO GAME PROCESSING PROGRAM

(75) Inventors: Jim Deal, Redmond, WA (US); Yosuke Shiokawa, Kirkland, WA (US)

(73) Assignee: Kabushiki Kaisha Square Enix, Tokyo (JP)

( * ) Notice: Subject to any disclaimer, the term of this patent is extended or adjusted under 35 U.S.C. 154(b) by 872 days.

(21) Appl. No.: 13/158,705

(22) Filed: Jun. 13, 2011

(65) Prior Publication Data

US 2012/0315997 A1 Dec. 13, 2012

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/40 | (2014.01) |

(52) U.S. Cl.
CPC ......... *A63F 13/10* (2013.01); *A63F 2300/5553* (2013.01); *A63F 2300/65* (2013.01); *A63F 2300/6607* (2013.01); *A63F 2300/8029* (2013.01)
USPC ........ 463/43; 463/5; 463/20; 463/23; 463/25; 463/31

(58) Field of Classification Search
USPC ................ 463/5, 20, 23, 25, 31, 43
See application file for complete search history.

(56) References Cited

U.S. PATENT DOCUMENTS

| | | | | |
|---|---|---|---|---|
| 6,270,416 B1 * | 8/2001 | Komoto | ...... | 463/43 |
| 2004/0204212 A1 * | 10/2004 | Sato | ...... | 463/5 |
| 2009/0118010 A1 | 5/2009 | Ashida et al. | | |

FOREIGN PATENT DOCUMENTS

| | | |
|---|---|---|
| JP | 9-075552 | 3/1997 |
| JP | 2003-019355 | 1/2003 |
| JP | 2006-116133 | 5/2006 |
| JP | 2006-187381 | 7/2006 |
| JP | 2006-314649 | 11/2006 |
| JP | 2007-037970 | 2/2007 |
| JP | 2010-072768 | 4/2010 |

OTHER PUBLICATIONS

Office Action from Japan Patent Office (JPO) in Japanese Patent Application No. 2011-132379, dated Jul. 9, 2013, along with an English language translation thereof.

(Continued)

*Primary Examiner* — Adetokunbo O Torimiro
(74) *Attorney, Agent, or Firm* — Greenblum & Bernstein, P.L.C.

(57) ABSTRACT

Multiple object information, in which first kind of object information indicating information on a first kind of object is associated with second kind of object information indicating information on a second kind of object, is stored in a multiple object information memory. The second kind of object is an object protected against a damage by means of the first kind of object. Multiple objects constructed by the first and second kinds of objects are displayed on a game screen on the basis of the multiple object information stored in the multiple object information memory. A damage cause indicating a cause of the damage that the displayed multiple objects receives is specified. At least the damage, which the second kind of object receives, is specified on the basis of the specified damage cause and a state of the first kind of object in the video game.

20 Claims, 6 Drawing Sheets

(56) References Cited

OTHER PUBLICATIONS

"Queensblade: Spiral Chaos-Complete Guide", (Japan, Enterbrain, Inc., Feb. 9, 2010, First Edition, p. 14-29), together with a partial English language tranlsation thereof.

Kentaro Murata, "The Legend of Zelda: Twilight Princess—The Complete Guide", (Japan, MediaWorks, Inc., Feb. 25, 2007, First Edition, p. 40), together with a partial English language tranlsation thereof.

"Queensblade: Spiral Chaos: System", [online], Apr. 10, 2009, Namco Bandai Games Inc., [Search on Jun. 28, 2013], Internet<URL:http://web.archive.org/web/20090410174842/http://www.psp-queensblade.com/system/002.html>, together with a partial English language tranlsation thereof.

"Tokyo Mono Hara Shi: Karasu No Mori Gaku En Ki Tan—The Master Guide", (Japan, ASCII Media Works Inc., Apr. 22, 2010, First Edition, p. 030-031, together with a partial English language tranlsation thereof.

"Queensblade: Spiral Chaos: System", [online], Apr. 27, 2009, Namco Bandai Games Inc., [Search on Jun. 28, 2013], Internet<URL:http://web.archive.org/web/20090427061127/http://www.psp-queensblade.com/system/004.html>, together with a partial English language tranlsation thereof.

Office Action from Japan Patent Office (JPO) in Japanese Patent Application No. 2011-125767, dated Nov. 25, 2014.

Shinichi Ando et al., "Queensblade: Spiral Chaos-Complete Guide", First Edition, Enterbrain, Inc., Feb. 9, 2010, p. 14-29, together with a partial English language translation.

* cited by examiner

Fig. 3

MULTIPLE OBJECT INFORMATION MANAGING TABLE

| OBJECT ID | FIRST KIND OF OBJECT INFORMATION ||||| SECOND KIND OF OBJECT INFORMATION ||||
|---|---|---|---|---|---|---|---|---|---|
| | SITE | IMAGE INFORMATION | BREAKAGE INFORMATION (BREAKAGE POINT) | CHANGE RULE (DISPLAY FORM CHANGING INFORMATION) | ... | IMAGE INFORMATION | ENDURANCE INFORMATION (ENDURANCE POINT) | WEAK POINT INFORMATION | ... |
| C101 | HEAD | ... | 0 | ... | ... | | 50 | W001 | ... |
| | BODY | ... | 0 | ... | ... | ... | | | ... |
| | LEFT ARM | ... | 0 | ... | ... | | | | ... |
| | RIGHT ARM | ... | 0 | ... | ... | | | | ... |
| | LEFT FOOT | ... | 0 | ... | ... | | | | ... |
| | RIGHT FOOT | ... | 0 | ... | ... | | | | ... |
| C102 | ... | ... | ... | ... | ... | ... | 80 | W002 | ... |
| ... | ... | ... | ... | ... | ... | ... | ... | ... | ... |

WEAK POINT INFORMATION

| WEAK POINT ID | IMAGE INFORMATION | LIFE INFORMATION (LIFE POINT) | ARRANGEMENT | ... |
|---|---|---|---|---|
| W001 | ... | 10 | CHEST | ... |
| W002 | ... | 20 | HEAD | ... |
| ⋮ | ⋮ | ⋮ | ⋮ | ⋮ |

VIDEO GAME PROCESSING APPARATUS AND VIDEO GAME PROCESSING PROGRAM

BACKGROUND OF THE INVENTION

1. Field of the Invention

The present invention relates to technique to control progress of a video game.

2. Description of the Related Art

Heretofore, various video games including a video game called an RPG (role-playing game: a game in which a player plays a role of a character in a world of the game, and accomplishes a predetermined object while enjoying a process that the character grows through various experiences) and a simulation game have been provided.

In a video game processing apparatus for carrying out such a video game, a shooter game in which a score according to time required to clear the video game is displayed is configured so as to: detect which landed region of an enemy character a landed position by shooting of a player belongs to; determine extinction time of the enemy character in accordance with a detected result; and carry out a calculation for extinction of the enemy character by means of the determined extinction time (see, for example, Japanese Patent Application Publication No. 09-075552, which is referred to as "Patent Literature 1").

However, in the conventional video game processing apparatus, in a case where a landed region or the like is set up on every site of the enemy character, a method of dividing the enemy character into a plurality of sites has been limited to division of the appearance of the enemy character. Namely, in the conventional video game processing apparatus, like one that carries out a shooter game described in Patent Literature 1, there has been one in which an enemy character is divided into a plurality of regions and parameters are respectively provided for the divided regions. This method of dividing them is one in which the appearance of the enemy character is merely divided. In other words, the conventional video game processing apparatus divides a region at which the player can aim as a target into a plurality of sites, and controls the enemy character for which parameters are respectively provided to the divided sites.

For that reason, in the video game controlled by the conventional video game processing apparatus, there has been a problem that it is impossible to realize a scene in which an armor of the enemy character is broken and the inside of the armor (that is, a body of the enemy character) is attacked, for example.

Namely, in the conventional video game processing apparatus, it has not been considered parameter settings of a portion invisible from the appearance (including the case where a part of a portion is displayed on a game screen only after a character gets injured, for example) for the enemy character. Therefore, there has been a problem that variation in a battle method against an enemy character is poor.

Such a problem is not limited to the shooter game, and it becomes a problem in the overall video game processing apparatus for controlling a type of video game to attack a target.

SUMMARY OF THE INVENTION

The present invention has been made in order to solve the problem described above, and it is an object of the present invention to increase variation in a battle method compared with the case where the appearance of a character is divided into a plurality of regions, and this makes it possible to improve interest in the video game of a player.

In order to achieve the above object, in one aspect of the present invention, the present invention is directed to a video game processing apparatus for controlling progress of a video game. The video game processing apparatus according to the present invention includes a multiple object information memory that stores multiple object information therein, first kind of object information being associated with second kind of object information in the multiple object information, the first kind of object information indicating information on a first kind of object, the second kind of object information indicating information on a second kind of object, the second kind of object being an object that is protected against a damage by means of the first kind of object.

The video game processing apparatus also includes a multiple object display controller that displays multiple objects on a game screen on the basis of the multiple object information stored in the multiple object information memory, the multiple objects being constructed by the first kind of object and the second kind of object.

The video game processing apparatus also includes a damage cause specifier that specifies a damage cause, the damage cause indicating a cause of the damage that the multiple objects displayed by the multiple object display controller receives.

The video game processing apparatus also includes a damage specifier that specifies at least the damage, which the second kind of object receives, on the basis of the damage cause specified by the damage cause specifier and a state of the first kind of object in the video game.

Since the video game processing apparatus has a configuration as described above, it is possible to increase variation in a battle method compared with the case where the appearance of a character is divided into a plurality of regions, and this makes it possible to improve interest in the video game of a player.

In the video game processing apparatus according to the present invention, it is preferable that the first kind of object information contains image information for displaying the first kind of object on the game screen and breakage information indicating the degree of breakage of the first kind of object, wherein the second kind of object information contains image information for displaying the second kind of object on the game screen and endurance information indicating the degree at which the second kind of object can endure the damage, wherein the damage specifier includes: a protection determiner that determines whether there is a relationship that the first kind of object protects the second kind of object against the damage cause or not on the basis of the state of the first kind of object; a first kind of damage specifier that specifies a first kind of damage in a case where the protection determiner determines that there is the relationship that the first kind of object protects the second kind of object, the first kind of damage indicating a damage that the first kind of object receives in accordance with the damage cause; a second kind of damage specifier that specifies a second kind of damage in a case where the protection determiner determines that there is no relationship that the first kind of object protects the second kind of object, the second kind of damage indicating a damage that the second kind of object receives in accordance with the damage cause; and a state specifier that specifies the state of the first kind of object in the video game on the basis of the image information contained in the first kind of object information and the breakage information, and wherein the video game processing apparatus further comprises: a breakage information updater that updates the breakage information on the basis of the first kind of damage among the damage specified by the damage specifier; and an endurance information updater that updates the endurance information on the basis of the second kind of damage among the damage specified by the damage specifier.

In the video game processing apparatus according to the present invention, it is preferable that the video game processing apparatus further comprises a battle impossible determiner that determines whether the multiple objects becomes a battle impossible state or not on the basis of the endurance information.

In the video game processing apparatus according to the present invention, it is preferable that the video game processing apparatus further comprises an image information updater that updates the image information contained in the first kind of object information so that an area of the second kind of object protected by the first kind of object becomes narrower in a case where the breakage information updater updates the breakage information so that the degree of breakage of the first kind of object becomes advanced, wherein the multiple object display controller changes a display form of the multiple objects on the basis of the image information after update in a case where the image information updater updates the image information contained in the first kind of object information.

In the video game processing apparatus according to the present invention, it is preferable that weak point information is associated with the second kind of object information, the weak point information contains image information for displaying a weak point object on the game screen and life information indicating the degree at which the weak point object can endure the damage, and the weak point object indicates a weak point of the multiple objects, wherein the damage specifier includes a weak point damage specifier that specifies a weak point damage on the basis of the damage cause, the weak point information and the state of the first kind of object, and the weak point damage indicates a damage that the weak point object receives, and wherein the video game processing apparatus further comprises a life information updater that updates the life information on the basis of the weak point damage specified by the weak point damage specifier, wherein the battle impossible determiner determines whether the multiple objects are a battle impossible state or not on the basis of the life information in addition to the endurance information.

In the video game processing apparatus according to the present invention, it is preferable that the video game processing apparatus further comprises a battle impossible performance executor that carries out battle impossible performance in a case where the battle impossible determiner determines that the multiple objects becomes the battle impossible state, the battle impossible performance being defined in advance as performance carried out when the multiple objects become the battle impossible state, wherein battle impossible performance in a case where it is determined that the multiple objects becomes the battle impossible state on the basis of the endurance information is different from battle impossible performance in a case where it is determined that the multiple objects becomes the battle impossible state on the basis of the life information.

In the video game processing apparatus according to the present invention, it is preferable that the damage cause specifier specifies a generation position of the damage cause and a path from the generation position toward the multiple objects, wherein the protection determiner determines that the first kind of object has a relationship to protect the second kind of object in a case where the first kind of object is positioned on the path.

Moreover, in another aspect of the present invention, the present invention is directed to a video game processing program for controlling an operation of a video game processing apparatus that controls progress of the video game. The video game processing program according to the present invention causes the video game processing apparatus to execute steps including displaying multiple objects on a game screen on the basis of multiple object information stored in a multiple object information memory, the multiple objects being constructed by a first kind of object and a second kind of object, first kind of object information being associated with second kind of object information in the multiple object information, the first kind of object information indicating information on the first kind of object, the second kind of object information indicating information on the second kind of object, the second kind of object being an object that is protected against a damage by means of the first kind of object.

The steps also include specifying a damage cause, the damage cause indicating a cause of the damage that the multiple objects displayed in the displaying multiple objects on the game screen receives.

The steps also include specifying at least the damage, which the second kind of object receives, on the basis of the damage cause specified in the specifying a damage cause and a state of the first kind of object in the video game.

According to the present invention, it becomes possible to increase variation in a battle method compared with the case where the appearance of a character is divided into a plurality of regions, and this makes it possible to improve interest in the video game of a player.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 3 is an explanatory drawing showing an example of a storage state of multiple object information;

DETAILED DESCRIPTION OF THE INVENTION

Hereinafter, one embodiment of the present invention will be described with reference to the appending drawings.

Figure 1:
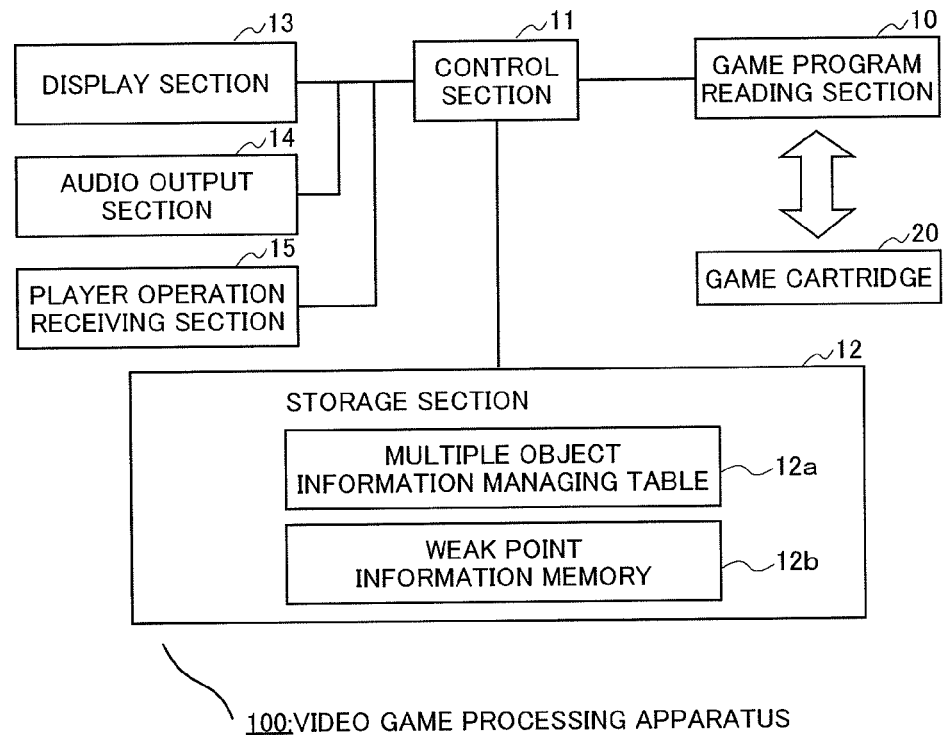
FIG. 1 is a block diagram showing a configuration example of a video game processing apparatus.

FIG. 1 is a block diagram showing a configuration example of a video game processing apparatus 100 according to one embodiment of the present invention. As shown in FIG. 1, the video game processing apparatus 100 includes: a game program reading section 10; a control section 11; a storage section 12; a display section 13; an audio outputting section 14; and a player operation receiving section 15.

The game program reading section 10 detachably receives a game cartridge 20 into which a storage medium is embedded. A game program is stored in the storage medium. The game program reading section 10 reads out a necessary game program from the storage medium in the inserted game cartridge 20. In this regard, in this embodiment, a video game program classified into a shooter game is stored in the storage medium embedded into the game cartridge 20. However, a category to which the video game program stored in the storage medium embedded into the game cartridge 20 belongs is not limited to the shooter game, and it may be a video game in which a target is attacked and defeated (or knocked down). Namely, the present invention can be applied to video game programs belonging to various categories, such as a so-called battle game in which a player character becomes a target from other player character, for example.

The control section 11 has a function to carry out the game program read out by the game program reading section 10, and to carry out various kinds of controls for causing the video game to proceed in response to operations by a player.

In particular, the control section 11 according to the present embodiment carries out necessary controls to cause the video game processing apparatus 100 to execute: multiple object display processing to display multiple objects on a game screen on the basis of multiple object information stored in a multiple object information managing table 12a, the multiple objects being constructed by a first kind of object and a second kind of object, first kind of object information being associated with second kind of object information in the multiple object information, the first kind of object information indicating information on the first kind of object, the second kind of object information indicating information on the second kind of object, the second kind of object being an object that is protected against a damage by means of the first kind of object; damage cause specification processing to specify a damage cause, the damage cause indicating a cause of the damage that the multiple objects displayed in the displaying multiple objects on the game screen receives; and damage specification processing to specify at least the damage, which the second kind of object receives, on the basis of the damage cause specified in the specifying a damage cause and a state of the first kind of object in the video game. In this regard, the multiple object information will be described later in detail.

The storage section 12 is a storage medium for storing game programs necessary when the video game is caused to proceed and various kinds of data. The storage section 12 is configured by a nonvolatile memory such as a RAM, for example. In the storage section 12, various kinds of information registered and updated in accordance with progress of the video game, and various kinds of information used in the video game, which are read out from the storage medium embedded into the game cartridge 20, are stored.

In the present embodiment, the storage section 12 includes a multiple object information managing table 12a and a weak point information memory 12b.

The multiple object information managing table 12a is a storage medium for storing multiple object information. In the multiple object information, first kind of object information is associated with second kind of object information. The first kind of object information indicates information on a first kind of object. The second kind of object information indicates information on a second kind of object, which is an object protected against a damage by means of the first kind of object. In this regard, in the present embodiment, the multiple object information read out from the game cartridge 20 is stored in the multiple object information managing table 12a.

Here, the "first kind of object" means an object that wraps (or covers) the second kind of object of a plurality of objects constituting the multiple objects (or inside which the second kind of object is arranged). Further, in the present embodiment, the first kind of object means an object whose appearance in a virtual space (that is, its display form on the game screen) is changed in a case where the object receives a damage in accordance with progress of the video game.

Further, the "second kind of object" means an object that is wrapped (or covered) with the first kind of object of the plurality of objects constituting the multiple objects (or outside which the first kind of object is arranged). Further, in the present embodiment, the second kind of object means an object by which the multiple objects can become a state that a battle is impossible (hereinafter, referred to as a "battle impossible state") in a case where the object receives a damage in accordance with progress of the video game. In this regard, the "battle impossible state" according to the present embodiment means a state that the object is not targeted for an attack by other object.

Figure 2:
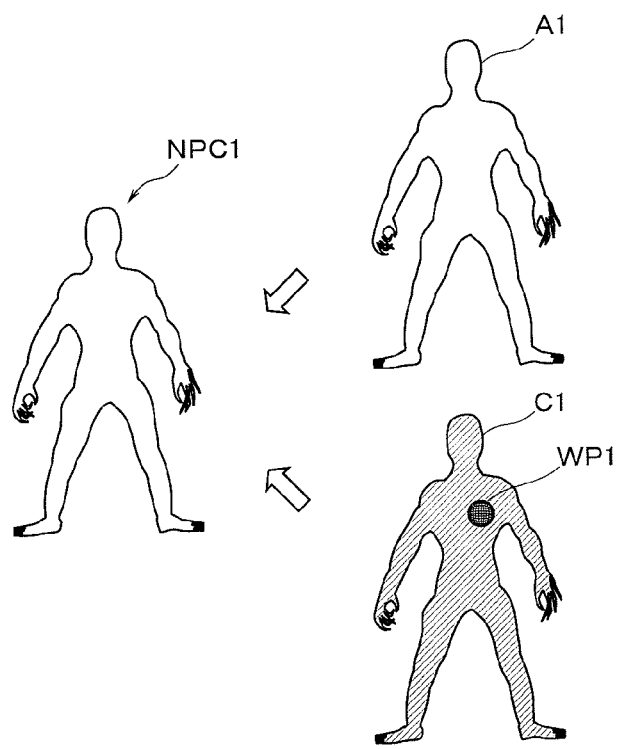
FIG. 2 is an explanatory drawing for explaining a concept of multiple objects.

FIG. 2 is an explanatory drawing for explaining a concept of the multiple objects according to the present embodiment. As shown in FIG. 2, in a case where an enemy character (or enemy) NPC1 is set to multiple objects, the enemy character NPC1 includes a first kind of object A1 indicating an armor portion (hereinafter, referred to as an "armor A1") and a second kind of object C1 indicating a core portion (hereinafter, referred to as a "core C1"). Namely, the control section 11 displays an object, in which the armor A1 is superimposed on the core C1, on the game screen as the enemy character NPC1. In this regard, the multiple objects are not limited to the enemy character, and it may be the player character operated by the player.

In this regard, in the present embodiment, on a protected layer on which the core C1 is arranged (hereinafter, referred to arbitrarily as a "core layer"), a weak point object WP1 serving as a "weak point" of the enemy character NPC1 (hereinafter, referred to as a "weak point WP1") is arranged. In this regard, the "weak point" according to the present embodiment will be described later in detail.

FIG. 3 is an explanatory drawing showing an example of a storage state of the multiple object information in the multiple object information managing table 12a. As shown in FIG. 3, in the present embodiment, the multiple object information contains an object ID for uniquely specifying multiple objects, first kind of object information, and second kind of object information.

In the present embodiment, the first kind of object information contains: image information for displaying the first kind of object on the game screen for each of sites constituting the multiple objects; a breakage point; and a change rule.

Here, the "site" means a region for which the control section 11 receives an attack against the multiple objects, and it is preferable that the "site" for each of the multiple objects is set up in a persuasive way. Namely, in a case of a humanoid type of enemy character NPC1, for example, the enemy character NPC1 is divided into sites including a head, a body, a left arm, a right arm, a left foot and a right foot. In this regard, a method of dividing the multiple objects is not particularly limited. For example, multiple object information indicating multiple objects constructed by a single site may be stored in the multiple object information managing table 12*a*.

Further, the "breakage point" is a point used as breakage information indicating the degree of breakage of the first kind of object in the virtual space (or a game space). More specifically, in a case where the first kind of object according to each site (for example, respective sites constituting the armor A1) receives an attack, the breakage point is increased in accordance with the received attack. Then, when the breakage point reaches the maximum point defined in advance (for example, "100"), the control section 11 considers that the first kind of object is completely destroyed.

In this regard, in the present embodiment, the breakage point is completely different from body strength (in the present embodiment, an endurance point contained in the second kind of object information or a life point contained in the weak point object, which will be described later) of the multiple objects themselves (for example, the enemy character NPC1). Even though the breakage point does not become the maximum point defined in advance (that is, before it seems that the first kind of object is completely destroyed), the corresponding multiple objects may become a battle impossible state. Further, even though the breakage point becomes the maximum point defined in advance (that is, it seems that the first kind of object is completely destroyed), the corresponding multiple objects may not become a battle impossible state.

In this regard, the video game processing apparatus 100 may be configured so that a part of the first kind of object remains on the game screen even though the breakage point becomes the predetermined point.

Further, in the present embodiment, by showing a damage state of the armor A1 (that is, a change of the armor A1 due to the received damage) on the basis of the first kind of object information, the player is allowed to recognize that the armor A1 receives the damage and strength is decreased (in the present embodiment, the effect that the breakage point is increased). In this regard, it is required that the number of the damage states (that is, the number of display forms of the first kind of object) is scalable, and is also required that they are switched smoothly on the basis of threshold values of strength set up for each of the first kind of objects. In the present embodiment, by utilizing the breakage point and the change rule contained in the first kind of object information, the control section 11 realizes a smooth change of the display forms of the first kind of object in accordance with the damage that the first kind of object receives.

Further, the "change rule" means information (hereinafter, referred to as "display form changing information") indicating a change rule of the display form of the first kind of object according to respective sites of the multiple objects. It is preferable that the change rule is constructed so that an area in which the first kind of object hides the second kind of object in accordance with an increase of the breakage point. In the present embodiment, as a change rule corresponding to the enemy character NPC1 (object ID "C101"), the case where "an armor is ripped (or left off) in accordance with an increase of the breakage point" or "the armor is completely destroyed at the probability of 50% in a case where an attack is received when the endurance point is 50% or more" will be described as an example (see FIG. 3).

Figures 4A, 4B, 4C, 5:
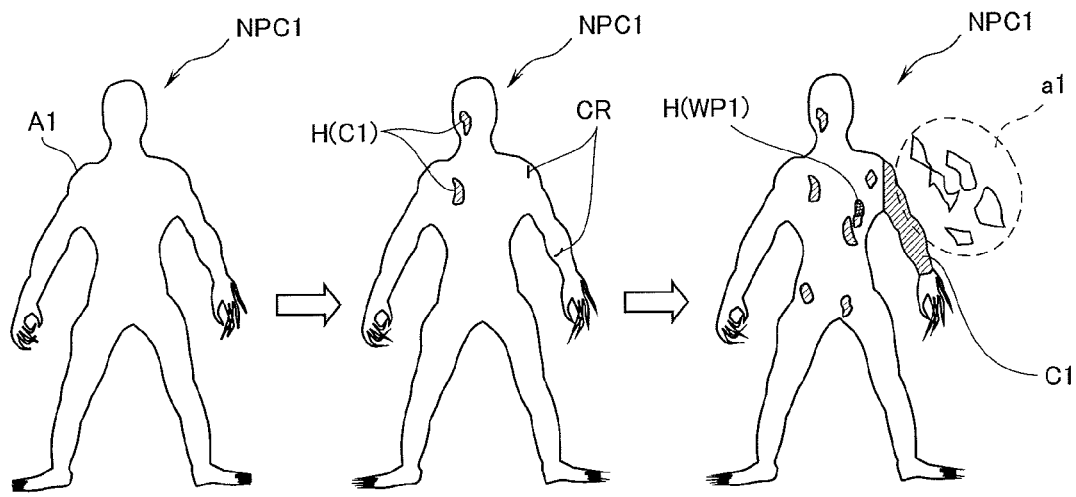
FIGS. 4A to 4C are explanatory drawings for explaining an endurance point.
FIG. 5 is an explanatory drawing showing an example of a storage state of weak point information.

FIGS. 4A to 4C are explanatory drawings for explaining the breakage point according to the present embodiment. As shown in FIG. 4A, a state that the core C1 of the enemy character NPC1 is not displayed (that is, a state that the armor A1 is arranged outside the core C1 in the virtual space) indicates a display form of the enemy character NPC1 when the breakage point is "0". In this case, when the breakage point of the armor A1 is increased in accordance with progress of the video game, as shown in FIG. 4B, a part of the armor A1 is broken, and a part of the core C1 under the armor A1 is exposed from a breakage portion H. In this regard, in the present embodiment, for example, when a head of the enemy character NPC1 is attacked in response to an operation by the player, as shown in FIG. 4B, the display form of the armor A1 is changed so that a breakage portion H (C1) indicating the core C1 is displayed at the head of the enemy character NPC1. Further, in the present embodiment, depending upon the amount of the damage that the armor A1 receives (in the present embodiment, the amount of increase in the breakage point), the display form of the armor A1 is changed so that a crack CR, by which the core C1 cannot be viewed, is displayed, as shown in FIG. 4B.

In this regard, a method of causing the breakage portion H to appear is not particularly limited thereto. For example, the video game processing apparatus 100 may be configured so that a plurality of breakage portions H are caused to appear in a random manner to become a breakage quantity according to the breakage point for each of the first kind of objects corresponding to the respective sites constituting the enemy character NPC1. Further, the video game processing apparatus 100 may be configured so that a position in the first kind of object where an attack is received is specified and the breakage portion H is caused to appear at the specified position. In this regard, a shape of the breakage portion H has no need to be uniform. For example, in a case where a breakage portion is caused to appear newly, the video game processing apparatus 100 may be configured so that the control section 11 selects one breakage shape from a plurality of breakage shapes different from each other in accordance with a predetermined rule.

Further, in the present embodiment, when a damage that the armor A1 receives is accumulated and an increase in the endurance point progresses, as shown in FIG. 4C, the whole armor portion a1 corresponding to the respective sites constituting the enemy character NPC1 may be broken. Further, as shown in FIG. 4C, the breakage portion H (WP1) indicating a part of the weak point WP1 arranged on the core layer may be displayed.

When the display form of the armor A1 is changed and the core C1 and the weak point WP1 can be viewed, for example, the player who is allowed to carry out the attack specifying an attack point to the enemy character NPC1 in the video game can carry out an attack against the core C1 and/or the weak point WP1.

In this regard, the configuration of the first kind of object information is not limited to the example described above, and the first kind of object information may be configured so that the second kind of object cannot be protected in accordance with the progress of the video game. Namely, for example, in a case where an attack site is not specified and the enemy character NPC1 does not receives an attack, it may be configured so that the breakage points according to the received attack are distributed into respective sites in a random manner. By configuring the video game processing apparatus 100 in this manner, it is possible to improve predictive resistance of progress of the video game.

Further, in the present embodiment, the second kind of object information (see FIG. 3) contained in the multiple object information contains: image information for displaying the second kind of object on the game screen; an endurance point; and weak point information.

Here, the "endurance point" means a point used as endurance information indicating the degree at which the second kind of object can endure the damage. In the present embodiment, the core C1 that is the second kind of object is the enemy character NPC1 itself, which is substantially the multiple objects, and the endurance point is strength of the enemy character NPC1 itself. Namely, in the present embodiment, the endurance point of the core C1 allows to determine whether the enemy character NPC1 becomes a battle impossible state or not (hereinafter, referred to arbitrarily as "battle impossible determination").

In this regard, in the present embodiment, the core C1 is a portion that tends to receive a damage, and the weak point WP1 is positioned within the core C1. Namely, in a case where it is thought that the armor A1 is an "outer layer" of the core C1, it can be thought that the weak point WP1 is positioned at "the same layer" or an "inner layer" of the core C1.

Further, in the present embodiment, the armor A1 is configured by a plurality of portions (for example, a head and a body) against the enemy character NPC1, while the core C1 is dealt with as one continuous unit.

Further, it is preferable that the video game processing apparatus 100 is configured so that the second kind of object does not receive a damage in a case where the corresponding first kind of object (for example, the armor A1 corresponding to the core C1) is undamaged (that is, in a case where the breakage point is "0").

Further, the "weak point information" indicates information on the weak point object, which is a weak point of the multiple objects. Namely, in the present embodiment, the second kind of object information corresponding to the enemy character NPC1 contains the weak point information for controlling the weak point WP1. In this regard, only a weak point ID is shown in FIG. 3 as the weak point information. Details of the weak point information will be described later together with explanation for the weak point information memory 12b (see FIG. 5).

Further, in the present embodiment, the control section 11 searches the weak point information corresponding to the multiple objects, which is caused to appear on the game screen in accordance with progress of the video game, from the weak point information memory 12b, and registers the searched weak point information in the multiple object information managing table 12a. The control section 11 then updates the weak point information appropriately registered in accordance with the progress of the video game. In this regard, the video game processing apparatus 100 may be configured so that the weak point information is set as information unique to every kind of multiple object information.

The weak point information memory 12b is a storage medium for storing the weak point information indicating information on the weak point object, in which the life point is set up, of the second kind of object. The life point is a point free from the endurance point.

Here, in the present embodiment, the "weak point" is a concept used for the battle impossible determination of the multiple objects. In the present embodiment, in order to carry out the battle impossible determination on the basis of other criteria than that for the endurance information (for example, the endurance point) used for the battle impossible determination of the multiple objects, the weak point object for which the life information (for example, the life point) is set up is associated with the multiple objects. In this regard, in the present embodiment, the case where the weak point WP1, which is an object other than the core C1, is set up for the enemy character NPC1 will be described as an example (see FIG. 2).

In this regard, the configuration of the "weak point" in the multiple objects is not limited to the configuration, in which criteria information other than the endurance information (that is, the information used for the battle impossible determination) is used. The video game processing apparatus 100 maybe configured so that the second kind of object receives an increased damage (that is, a damage lager than that in a case where the same attack hits any portion other than the weak point (in the present embodiment, the core C1)) in a case where an attack hits the weak point like a head shot in a shooter, for example.

FIG. 5 is an explanatory drawing showing an example of a storage state of the weak point information in the weak point information memory 12b. As shown in FIG. 5, in the present embodiment, the weak point information contains: a weak point ID for uniquely specifying the weak point object; image information for displaying the weak point object, which indicates a weak point of the multiple objects, on the game screen; a life point; and arrangement information.

Here, the "life point" means a point used as the life information indicating the degree at which the weak point object can endure the damage. Namely, the life point for the weak point object corresponds to the endurance point for the second kind of object. In the present embodiment, for example, when the life point of the weak point WP1 becomes a predetermined point (for example, "0") or less due to an attack against the enemy character NPC1 or the like, the control section 11 determines that the weak point is dead, and processes, with no relationship to health states of the core C1 and the armor A1 (in the present embodiment, the states of the endurance point and the breakage point), the enemy character NPC1 so that the enemy character NPC1 becomes a battle impossible state.

Further, the "arrangement information" means positional information indicating arrangement of the weak point object with respect to the second kind of object in the virtual space. In the present embodiment, a relative position to the second kind of object is set up in the weak point object. Namely, for example, in a case of an enemy character NPC1 for which the corresponding arrangement information indicates a "chest" (see FIGS. 2 and 5), the weak point WP1 is arranged at the "chest" of a human shape, which is indicated by the core C1. In this regard, in the present embodiment, at least one weak point is provided in each of a large majority (or all) of enemy characters.

In this regard, the video game processing apparatus 100 may be configured so as to manage the breakage point, the endurance point and the life point as health values (HP) of the objects (that is, the first kind of object, the second kind of object and the weak point object), respectively. Namely, each of the breakage information, the endurance information and the life information may be configured so as to have an initial value and a lower limit value each of which is indicated by a numerical number that is reduced in accordance with a damage that the corresponding object receives.

The display section 13 is a display device for displaying the game screen in response to operations by the player in accordance with control by the control section 11. The display section 13 is constructed by a liquid crystal display, for example.

The audio outputting section 14 outputs audio in response to operations by the player and progress of the video game in accordance with control by the control section 11.

The player operation receiving section 15 receives operational signals in response to operations by the player via a controller constructed by a plurality of buttons and a mouse, and notifies the control section 11 of its result. In the present embodiment, the player operation receiving section 15 is constructed by a touch panel.

Next, an operation of the video game processing apparatus 100 according to the present embodiment will be described.

Figure 6:
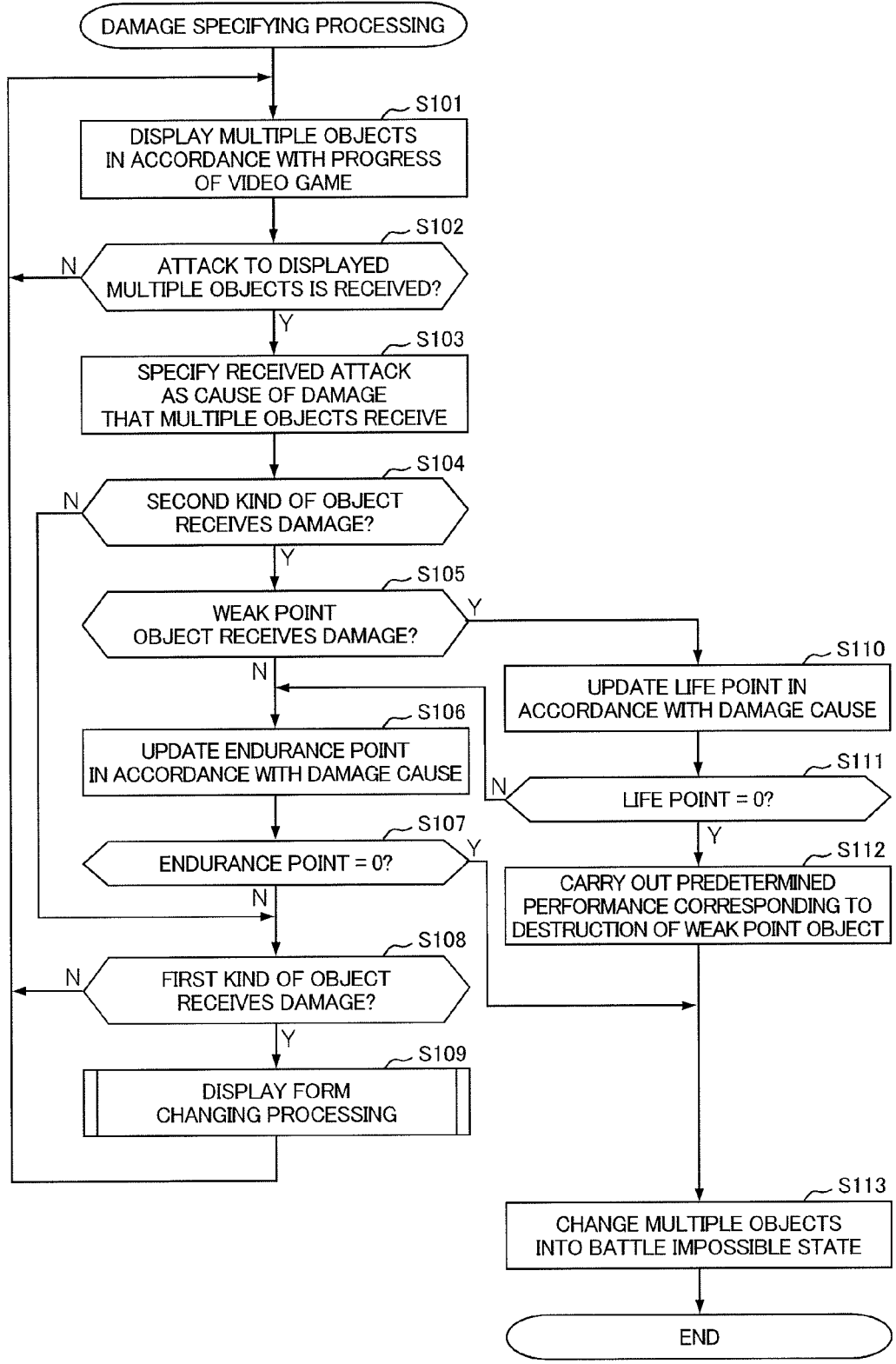
FIG. 6 is a flowchart showing an example of damage specifying processing.

FIG. 6 is a flowchart showing an example of damage specifying processing carried out by the video game processing apparatus 100. In the damage specifying processing, processing to specify damages that a plurality of objects, which constitute multiple objects, respectively receive (that is, a breakage point, an endurance point and an influence quantity to a life point) in accordance with progress of the video game and to cause the video game to proceed in accordance with the specified damages is carried out. In this regard, processing with no relationship to the present invention may be omitted.

The damage specifying processing according to the present embodiment is started in a case where the video game is started, for example.

In the damage specifying processing, the control section 11 first causes the display section 13 to display multiple objects on the display screen in accordance with progress of the video game (Step S101). In this regard, the control section 11 registers, in accordance with the game program read out by the game program reading section 10, the multiple object information according to the progress of the video game to the multiple object information managing table 12.

Figure 7:
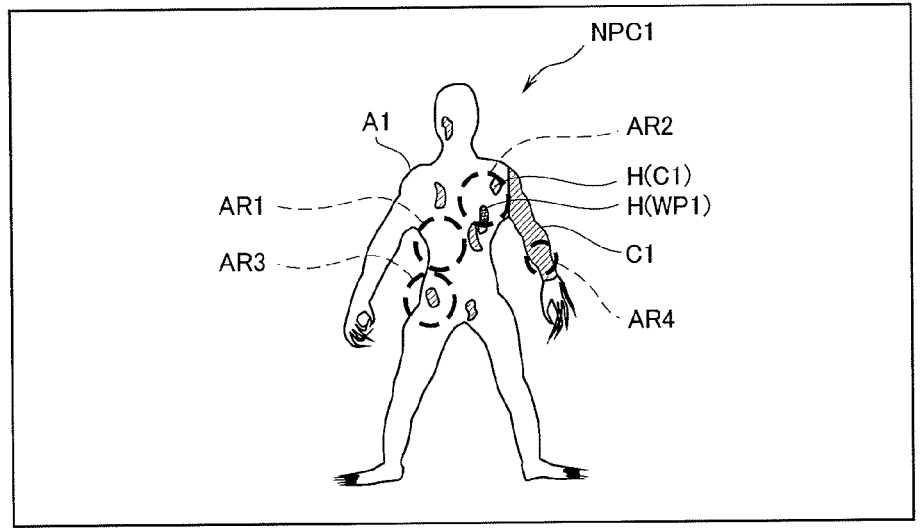
FIG. 7 is an explanatory drawing for explaining an example of a display screen on which the multiple objects are displayed.

FIG. 7 is an explanatory drawing for explaining an example of the display screen on which the multiple objects are displayed. Hereinafter, as shown in FIG. 7, the case where an enemy character NPC1, which is constructed by an armor A1 including a plurality of breakage portions H, a core C1 that can be viewed from the breakage portion H by an operator (hereinafter, referred to as a "player A") of the video game processing apparatus 100 (that is, the core C1 is displayed on the display screen), and a weak point WP1 that can also be viewed from the breakage portion H by the player A, is displayed on the display screen will be described as an example.

When the enemy character NPC1 is displayed on the display screen as the multiple objects, the control section 11 determines whether an attack against the displayed multiple objects is received or not (Step S102). Here, in a case where it is determined that the attack against the multiple objects is not received ("No" at Step S102), the control section 11 causes the processing flow to return to the process at Step S101.

On the other hand, in a case where it is determined that the attack against the multiple objects is received in response to, for example, an operation by the player A ("Yes" at Step S102), the control section 11 specifies the received attack as a cause of the damage that the multiple objects receive (hereinafter, referred to as the "damage cause") (Step S103). In the present embodiment, the control section 11 specifies information, which contains attack power of an attack that the enemy character NPC1 receives and an area affected by the attack (hereinafter, referred to as an "effective area"), as a damage cause on the basis of various kinds of information according to the kind of the received attack (for example, determination rules of attack power and the area affected by the attack and the like).

When the damage cause is specified, the control section 11 determines whether the second kind of object receives a damage by means of the specified damage cause or not (Step S104). In the present embodiment, the control section 11 determines whether the second kind of object receives a damage or not by determining whether there is a relationship that the first kind of object protects the second kind of object against the specified damage cause or not.

More specifically, the control section 11 specifies a state of the first kind of object in the video game on the basis of the image information contained in the first kind of object information and the breakage information, and determines whether there is the relationship that the first kind of object protects the second kind of object against the damage cause or not, thereby specifying the damage that the second kind of object receives.

More specifically, the control section 11 determines that there is the relationship that the first kind of object protects the second kind of object, on the basis of the image information and the breakage information contained in the first kind of object information, as for an area in which the first kind of object displayed on the display screen hides the second kind of object in the effective area of the attack specified as the damage cause (that is, an area in the effective area in which the first kind of object is displayed and the second kind of object is not thus displayed). The control section 11 then determines that the second kind of object receives the damage in a case where it is determined that the second kind of object is displayed in the effective area. On the other hand, the control section 11 determines that the second kind of object does not receive the damage in a case where it is determined that the second kind of object is not displayed in the effective area.

Here, for example, in a case where only the armor A1 is displayed in the effective area specified as the damage cause like the effective area AR1 shown in FIG. 7, the control section 11 determines that the second kind of object (in the present embodiment, the core C1) does not receive the damage ("No" at Step S104), and causes the processing flow to proceed to a process at Step S108 (will be described later).

On the other hand, for example, in a case where a part of the core C1 is displayed in the specified effective area like the effective area AR2 shown in FIG. 7, the control section 11 determines that the second kind of object receives the damage ("Yes" at Step S104), and determines whether the weak point object receives the damage by means of the specified damage cause or not (Step S105). In this regard, the control section 11 carries out the processing to determine whether the weak point object receives the damage or not, which is similar to the processing to determine whether the second kind of object receives the damage or not. Further, in the present embodiment, the case where the control section 11 deals with the weak point object as one type of the second kind of objects will be described.

Here, in a case where the weak point WP1 is displayed in the specified effective area in the effective area AR2 shown in FIG. 7, for example, the control section 11 determines that the weak point object receives the damage ("Yes" at Step S105), and causes the processing flow to shift to a process at Step S110.

On the other hand, in a case where the weak point WP1 is not displayed in the specified effective area like the effective area AR3 shown in FIG. 7, for example, the control section 11 determines that the weak point object does not receive a damage ("No" at Step S105), and updates the endurance point in accordance with the specified damage cause (Step S106). In the present embodiment, the control section 11 specifies a damage quantity according to the damage cause, and updates the endurance point by subtracting the specified damage quantity from the endurance point.

In this regard, in the present embodiment, the control section 11 specifies the damage quantity according to the damage cause depending upon how the destruction (or breakage) of the armor A1 becomes advanced. Namely, the control section 11 specifies the damage quantity according to the damage cause so that the wider the area of the weak point WP1 displayed in the effective area becomes, the more the damage quantity increases.

Further, the method of specifying the damage quantity is not limited to this one. For example, the video game processing apparatus 100 may be configured so as to specify the damage quantity on the basis of defensive power of the multiple objects contained in the multiple object information (not shown in the drawings) and attack power according to the type of the received attack. Further, for example, the video game processing apparatus 100 may be configured so that the control section 11 sets the damage quantity that the core C1 receives to "20" in a case where an area attack (that is, AoE attack or radius attack) to the enemy character NPC1 is received at the state that one site of the armor A1 is destroyed, and the control section 11 sets the damage quantity to "100" in a case where the AoE attack is received at the state that there is no armor A1 of the enemy character NPC1. Namely, the video game processing apparatus 100 may be configured so as to increase the damage quantity that the second kind of object receives by means of the same attack whenever any of a plurality of first kind of objects set to the same multiple objects is destroyed.

When the endurance point is updated, the control section 11 determines whether the endurance point after update (that is, "remaining endurance point": an endurance point obtained by subtracting a damage quantity according to an attack from the endurance point before the attack is received) becomes "0", which is the minimum value of the endurance point, or not (Step S107). Here, in a case where it is determined that the endurance point of the core C1 becomes "0" ("Yes" at Step S107), the control section 11 causes the processing flow to shift to a process at Step S113 (will be described later).

On the other hand, in a case where it is determined that the endurance point after update is not "0" ("No" at Step S107), the control section 11 determines whether the first kind of object receives the damage by means of the specified damage cause or not (Step S108). In this regard, the control section 11 carries out the processing to determine whether the first kind of object receives the damage or not, which is similar to the processing to determine whether the second kind of object receives the damage or not.

Here, for example, in a case where the armor A1 is not included in the specified effective area like the effective area AR4 shown in FIG. 7, the control section 11 determines that the first kind of object does not receive a damage ("No" at Step S108), and causes the processing flow to return to the process at Step S101.

On the other hand, in a case where the armor A1 is included in the specified effective area like the effective areas AR1 to AR3 shown in FIG. 7, for example, the control section 11 determines that the first kind of object receives a damage ("Yes" at Step S108), and carries out display form changing processing for changing a display form of the first kind of object in accordance with the damage that the first kind of object received (Step S109). The control section 11 then causes the processing flow to return to the process at Step S101. In this regard, the display form changing processing will be described later in detail (see FIG. 8).

On the other hand, in a case where it is determined, in the process at Step S105 in the damage specifying processing, that the weak point object receives a damage by the specified damage cause ("Yes" at Step S105), the control section 11 updates the life point of the weak point WP1 in accordance with the damage cause (Step S110). In the present embodiment, the control section 11 specifies the damage quantity that the weak point WP1 receives on the basis of a kind of the received attack and the like, and updates the life point on the basis of the specified damage quantity. In this regard, in order to specify the damage quantity that the weak point object receives, the control section 11 may be configured so as to carry out the processing similar to the processing to specify the damage quantity that the second kind of object receives.

When the life point is updated, the control section 11 determines whether the life point after update (that is, a life point obtained by subtracting the damage quantity according to the attack from the life point before the attack is received, hereinafter, referred to arbitrarily as a "remaining life point") becomes "0", which is the minimum value of the life point, or not (Step S111). Here, in a case where it is determined that the life point of the weak point WP1 does not become "0" ("No" at Step S111), the control section 11 causes the processing flow to return to the process at Step S106.

On the other hand, in a case where it is determined that the remaining life point after update becomes "0" ("Yes" at Step S111), the control section 11 determines that the weak point WP1 is destroyed, and carries out predetermined performance (for example, performance indicating that the enemy character NPC1 becomes a battle impossible state due to destruction of the weak point WP1) corresponding to the case where the weak point WP1 is destroyed (Step S112). In this regard, it is preferable that the performance carried out by the control section 11 at this time is different from performance indicating that the enemy character NPC1 becomes a battle impossible state when the endurance point of the core C1 becomes "0". In this regard, the video game processing apparatus 100 may be configured so as to determine whether the weak point WP1 (and other objects) is completely destroyed depending upon the number of times damage is received.

When the predetermined performance indicating that the weak point object is destroyed, the control section 11 changes the multiple object information into a battle impossible state (Step S113), and terminates the processing herein. In this regard, in the present embodiment, the control section 11 carries out, as processing to change the multiple objects into the battle impossible state, various kinds of processing defined in advance for each of the multiple objects (that is, battle impossible state shifting processing), such as processing to erase the enemy character NPC1, whose weak point WP1 is destroyed, from the game screen, and processing to apply a reward, which is different from one in a case where the endurance point becomes "0" and the enemy character NPC1 is thereby caused to become battle impossible, to the player A (for example, processing to apply attack information, which allows the player A to carry out an advanced attack, to player information indicating information on the player A).

Next, the display form changing processing carried out by the video game processing apparatus 100 will be described with reference to the appending drawings.

Figure 8:
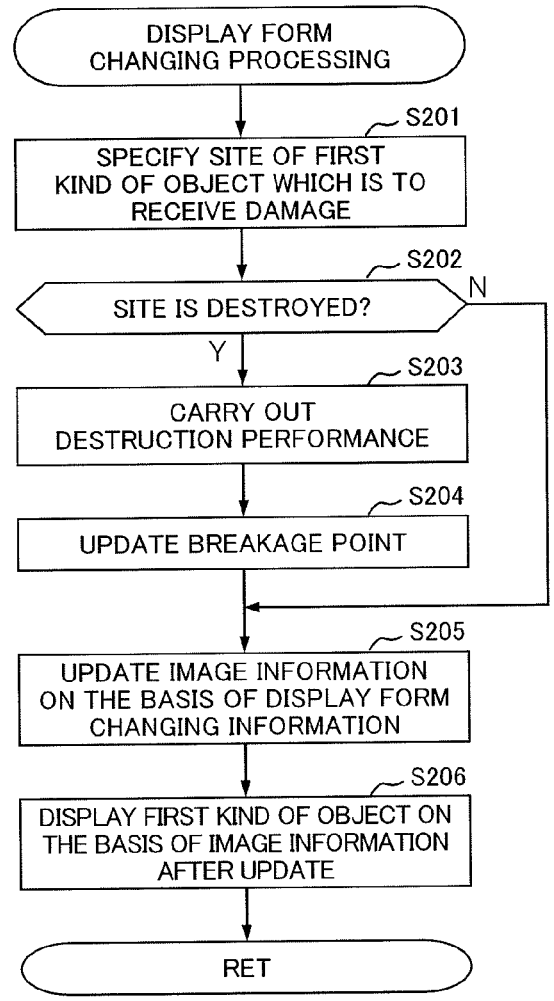
FIG. 8 is a flowchart showing an example of display form changing processing.

FIG. 8 is a flowchart showing an example of the display form changing processing carried out by the video game processing apparatus 100. In the display form changing processing, the processing for changing the display form of the first kind of object in accordance with the attack that the first kind of object received is carried out. In this regard, the content of any processing with no relationship to the present invention may be omitted.

The display form changing processing according to the present embodiment is started as part of the damage specifying processing carried out by the video game processing apparatus 100 (see Step S109 in FIG. 6).

In the display form changing processing, the control section 11 first specifies a site of the armor A1, which is to receive the damage, in accordance with the damage cause specified in the damage specifying processing (Step S201). In the present embodiment, the control section 11 specifies a site included in the effective area of the attack specified as the damage cause as a site that is to receive the damage.

When the site that is to receive the damage is specified, the control section 11 determines, on the basis of the display form changing information, whether the site that is to receive the damage is destroyed or not (Step S202). In this regard, as change rules of the display form indicated by the display form changing information, for example, various rules, such as a rule "a left arm is completely destroyed by probability of 50% in a case where a damage is received on the left arm when a breakage point of the left arm is 50% or more", are considered.

Here, in a case where it is determined that the site that is to receive the damage is not destroyed ("No" at Step S202), the control section 11 causes the processing flow to proceed a process at Step S204 (will be described later). On the other hand, for example, in a case where it is determined that a breakage point of the "left arm" specified as a site that is to receive the damage is "50" and the "left arm" is destroyed by receiving the damage ("Yes" at Step S202), the control section 11 carries out predetermined destruction performance (Step S203).

In a case where the destruction performance is carried out or it is determined that the site that is to receive the damage is not destroyed, the control section 11 updates the breakage point in accordance with the damage cause (Step S204). In the present embodiment, the control section 11 specifies the damage quantity according to the damage cause, and updates the breakage point by adding the specified damage quantity to the breakage point.

When the breakage point is updated, the control section 11 updates the image information of the first kind of object on the basis of the display form changing information (Step S205). In this regard, in a case where conditions by which the site is destroyed are met by updating the breakage point, the control section 11 carries out destruction performance in accordance with destruction of the site.

When the image information is updated, the control section 11 causes the display device 13 to display the first kind of object on the basis of the image information after update (that is, the control section 11 changes the display form of the armor A1 in accordance with the damage cause) (Step S206), and causes the processing flow to return to the process at Step S101 in the damage specifying processing. By changing the display form of the armor A1, for example, as shown in FIG. 7, the player A can view the core C1 and the weak point WP1 arranged inside the armor A1 in the virtual space and can attack the core C1 and the weak point WP1.

As explained above, in one embodiment described above, the video game processing apparatus 100 for controlling progress of the video game is configured so as to include the multiple object information managing table 12a that stores the multiple object information in which the first kind of object information indicating the information on the first kind of object (for example, the armor A1) is associated with the second kind of object information indicating the information on the second kind of object (for example, the core C1), which is the object that is protected against the damage by means of the first kind of object, wherein the multiple objects (for example, the enemy character NPC1) constructed by the first kind of object and the second kind of object are displayed on the game screen on the basis of the multiple object information stored in the multiple object information managing table 12a, the damage cause (for example, the damage cause including the attack power and the effective area), which is the cause of the damage that the displayed multiple objects receives is specified, and at least the damage that the second kind of object receives is specified on the basis of the specified damage cause and the state of the first kind of object in the video game (for example, the attack does not affect the second kind of object in a case where the second kind of object is hidden by the first kind of object within the effective area of the attack). Therefore, it becomes possible to increase variation in the battle method compared with the case where the appearance of a character is divided into a plurality of regions, and this makes it possible to improve interest in the video game of the player.

Namely, since the video game in which one object is separated into a plurality of layers and the plurality of layers are managed can be realized, it is possible to achieve the content of the video game different from that of the conventional video game. This makes it possible to improve interest in the video game of the player.

Further, for example, it becomes possible to achieve the video game including scenes such as a scene in which an armor of an enemy character is broken and the inside of the armor is attacked, and this makes it possible to improve interest in the video game of the player.

Further, in the embodiment described above, the video game processing apparatus 100 is configured so that: the first kind of object information contains the image information for displaying the first kind of object (for example, the armor A1 divided into the plurality of sites to be managed) on the game screen and the breakage information (for example, the breakage point) indicating the degree of breakage of the first kind of object, the second kind of object information contains the image information for displaying the second kind of object (for example, the core C1) on the game screen and the endurance information (for example, the endurance point) indicating the degree at which the second kind of object can endure the damage; it is determined whether there is the relationship that the first kind of object protects the second kind of object against the damage cause or not on the basis of the state of the first kind of object; the first kind of damage (for example, the damage quantity added to the breakage point), which indicates a damage that the first kind of object receives in accordance with the damage cause, is specified in a case where it is determined that there is the relationship that the first kind of object protects the second kind of object (for example, in a case where the first kind of object is displayed in the effective area specified as the damage cause); the second kind of damage (for example, the damage quantity obtained by being subtracted from the endurance point), which indicates a damage that the second kind of object receives in accordance with the damage cause, is specified in a case where it is determined that there is no relationship that the first kind of object protects the second kind of object (for example, in a case where the second kind of object is displayed in the effective area specified as the damage cause); the state of the first kind of object in the video game is specified on the basis of the image information and the breakage information, which are contained in the first kind of object information (for example, the display form of the armor A1 is specified); and the breakage information is updated on the basis of the first kind of damage of the specified damage; and the endurance information is updated on the basis of the second kind of damage of the specified damage (for example, the damage quantity according to an object is specified after the object that receives the damage is specified; the breakage information is updated on the basis of the first kind of damage of the specified damage; and the endurance information is updates on the basis of the second kind of damage of the specified damage). Therefore, it is possible to realize a scene that an armor of a character is ripped (or left off) and an inner portion of the armor can thereby be attacked in the video game, for example.

Namely, the video game processing apparatus 100 is configured so that the damage quantity against each of the plurality of objects constructing the multiple objects is specified in accordance with the damage cause. Therefore, for example, a difference of influences on progress of the video game can be provided depending upon which object a damage is applied to by means of just the same attack.

Further, in the embodiment described above, the video game processing apparatus 100 is configured so as to determine whether the multiple objects (for example, the enemy character NPC1) becomes a battle impossible state or not on the basis of the endurance information (for example, the endurance point). Therefore, with respect to one character, a portion, in which the character can become a battle impossible state by means of an attack against the portion, and other portion, in which the character cannot become a battle impossible state even by means of an attack against the other portion, can be provided, and it becomes possible to improve interest in the video game of the player. In this regard, in a case where update timing of the endurance information is limited to the time when the second kind of object receives a damage, the video game processing apparatus 100 determines, after the endurance information is updated on the basis of the second kind of damage, whether the multiple objects becomes a battle impossible state or not on the basis of the endurance information after update. Further, in a case where the endurance information is updated depending upon other elements (for example, satisfaction of an event generating condition in the video game) or the like, the video game processing apparatus 100 determines whether the character is in a battle impossible state or not on the basis of the updated endurance information whenever the endurance information is updated regardless of a cause by which the endurance information is updated.

Further, in the embodiment described above, the video game processing apparatus 100 is configured so as to: update the image information contained in the first kind of object information so that an area in which the first kind of object protects the second kind of object (for example, the core C1) becomes narrower (for example, so that a breakage portion H is caused to appear) in a case where the breakage information is updated so that the degree of breakage of the first kind of object (for example, the armor A1) becomes advanced (for example, in a case where the damage quantity is added to the breakage point); and change the display forms of the multiple objects on the basis of the image information after update (for example, change the display forms of the armor A1) in a case where the image information is updated. Therefore, the second kind of object associated with the battle impossible determination of the multiple objects can be displayed in a step-by-step manner in accordance with strength and the type of the attack that the multiple objects receives, and this makes it possible to increase variation in a battle method.

Namely, for example, it is possible to provide wide ranges to a battle method that the player can select, such as a method of attacking a core (for example, the core C1) exposed from a breakage portion after an exterior thereof (for example, the armor A1 for the enemy character NPC1) is broken to an extent, a method of attacking the core widely exposed after the exterior is destroyed, and the like.

Further, in the embodiment described above, the video game processing apparatus 100 is configured so that the weak point information that contains the image information for displaying the weak point object (for example, the weak point WP1), which indicates the weak point of the multiple objects (for example, the enemy character NPC1), on the game screen, and the life information (for example, life point), which indicates the degree at which the weak point object can endure the damage, is associated with the second kind of object information, and the video game processing apparatus 100 specifies the weak point damage, which is a damage that the weak point object receives (for example, the damage quantity subtracted from the life point) on the basis of the damage cause, the weak point information and the state of the first kind of object (for example, a display position of the armor A1); updates the life information on the basis of the weak point damage thus specified; and determines whether the multiple objects becomes a battle impossible state on the basis of the life information in addition to the endurance information (for example, endurance point). Therefore, for example, by setting the life point of the weak point object to a point lower than the endurance point of the second kind of object, it is possible to cause a character to become a battle impossible state efficiently by aiming at the weak point object. This makes it possible to increase variation in a battle method. For that reason, it is possible to improve interest in the video game of the player.

Further, in the embodiment described above, the video game processing apparatus 100 is configured so that: the battle impossible performance, which is defined in advance as performance carried out when the multiple objects become the battle impossible state, is carried out in a case where it is determined that the multiple objects (for example, the enemy character NPC1) becomes the battle impossible state; and battle impossible performance in a case where it is determined that the multiple objects becomes the battle impossible state on the basis of the endurance information (for example, in a case where the enemy character NPC1 is set to the battle impossible state when the endurance point becomes "0") is different from battle impossible performance in a case where it is determined that the multiple objects becomes the battle impossible state on the basis of the life information (for example, in a case where the enemy character NPC1 is set to the battle impossible state when the life point becomes "0"). Therefore, performance (for example, display of special animation showing a state where the enemy character whose weak point is hit or took down) different from ones in other cases can be carried out only in a case where the weak point is destroyed. This makes it possible to improve interest in the video game of the player.

Namely, since video game performance according to the battle impossible cause of the multiple objects can be carried out, it becomes possible to improve interest in the video game of the player.

In this regard, although it has not been mentioned particularly in the embodiment described above, the video game processing apparatus 100 may be configured so as to specify a generation position of the damage cause (for example, the damage cause including the attack power and the effective area) and the path from the generation position toward the multiple objects (for example, the enemy character NPC1), and to determine that there is the relationship that the first kind of object protects the second kind of object (for example, the core C1) in a case where the first kind of object (for example, the armor A1) is positioned on the path.

Figure 9:
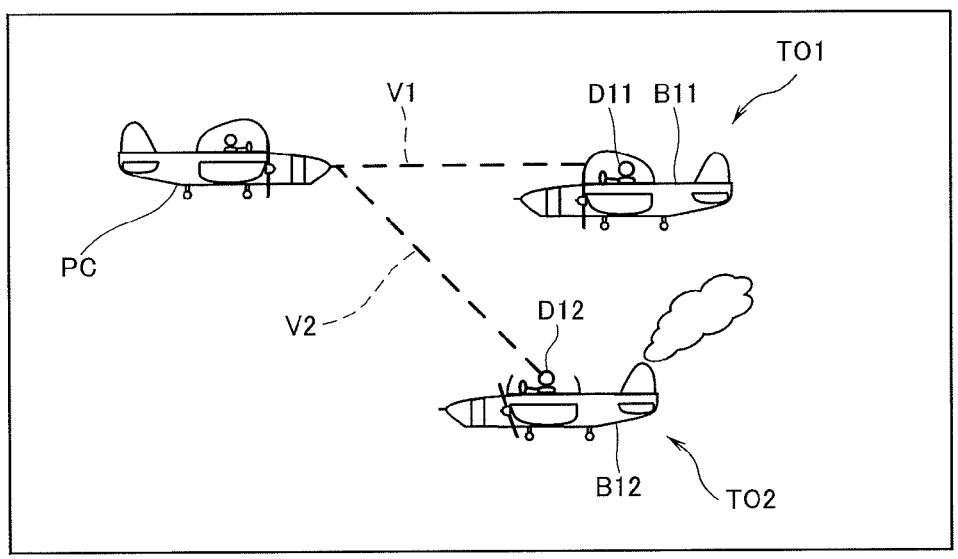
FIG. 9 is an explanatory drawing for explaining an example of the game screen in a case where a generation position of a damage cause and a path are reflected on specification of a damage.

FIG. 9 is an explanatory drawing for explaining an example of the game screen in a case where a generation position of the damage cause and a path are reflected on specification of the damage. In the example shown in FIG. 9, multiple objects are target objects TO1, TO2 that have a double structure including airplane objects B11, B12 (hereinafter, referred to as "airplanes B11, B12"), which are a first kind of object, and character objects D11, D12 (hereinafter, referred to as "characters D11, D12"), which are a second kind of object.

When attacks to both of the target objects TO1, TO2 by a player character PC are received, the control section 11 first specifies paths V1, V2 of the respective attacks. Then, with respect to an attack against the target object TO1, the control section 11 determines that a part of the airplane B11 is positioned on the path V1, and updates the endurance point of the airplane B11. Then, in a case where the endurance point of the airplane B11 becomes a predetermined point or lower, the control section 11 changes the display forms of the airplane B11 so that a part of the airplane B11 is broken and the character D11 is exposed to the outside like the airplane B12, for example.

On the other hand, with regard to an attack against the target object TO2, the control section 11 determines that a part of the airplane B12 is not positioned on the path V2 and the character D12 positioned on the path V2 is not protected, and updates the life point of the character D12. Then, in a case where the life point of the character D12 becomes "0", the control section 11 changes the target object TO2 into a battle impossible state.

In this regard, in the embodiment described above, it has been explained the case where the video game processing apparatus 100 specifies the effective area of the received attack and updates the information (for example, the breakage point, the endurance point and/or the life point) corresponding to the object included in the specified effective area (that is, the case where the attack applies damages to an area including a plurality of sites at a time). However, the kind of attack is not limited to this attack. For example, the video game processing apparatus 100 may be configured so that a damage is applied to only a single site at a time or a damage is applied to a total body of the attack target evenly. Further, the video game processing apparatus 100 may be configured so as to include an attack that penetrates the first kind of object to apply a damage to the second kind of object.

In this regard, although it has not been mentioned particularly in the embodiment described above, the video game processing apparatus 100 may be configured so that an attack against the weak point object is not received when the first kind of object (for example, the armor A1) is arranged on the game screen (for example, when the endurance point of the armor A1 is not "0") except for the case where a special attack or special ability is utilized. In this case, the video game processing apparatus 100 may be configured so that the weak point information contains information (attack receiving condition) indicating a state of the first kind of object (for example, the state of the endurance point) necessary for receiving an attack against the weak point object, for example.

In this regard, although it has not been mentioned particularly in the embodiment described above, the video game processing apparatus 100 may be configured so that the weak point object can move in the core layer. In this case, for example, the weak point information may be configured so as to contain movement information indicating movement rules of the weak point object.

In this regard, in the embodiment described above, the video game processing apparatus 100 has been configured so as to carry out various kinds of processing such as the game processing described above on the basis of the game program read out from the game cartridge 20. However, the game program may be acquired from a game server via a communication network such as the Internet. Further, the video game processing apparatus 100 may serve as a game server to provide a game terminal with the game program via a communication network.

Further, in the embodiment described above, the video game processing apparatus 100 carries out the various kinds of processing described above in accordance with a control program (program for processing a video game (game program, which may merely be called a program)) stored in a storage device (the storage section 12) equipped by the video game processing apparatus 100.

The present invention is useful to provide a hidden object game with high interest.

What is claimed is:

1. A video game processing apparatus for controlling progress of a video game, comprising:
 a multiple object information memory that stores multiple object information therein, first kind of object information being associated with second kind of object information in the multiple object information, the first kind of object information indicating information on a first kind of object, the second kind of object information indicating information on a second kind of object, the second kind of object being an object that is protected against a damage by means of the first kind of object;
 a multiple object display controller that displays multiple objects on a game screen on the basis of the multiple object information stored in the multiple object information memory, the multiple objects being constructed by the first kind of object and the second kind of object;
 a damage cause specifier that specifies a damage cause, the damage cause indicating a cause of the damage that the multiple objects displayed by the multiple object display controller receives; and
 a damage specifier that specifies at least the damage, which the second kind of object receives, on the basis of the damage cause specified by the damage cause specifier and a state of the first kind of object in the video game,
 wherein the first kind of object is arranged to cover the second kind of object in the video game on the game screen, and
 the first kind of object has an appearance which changes in the video game on the game screen when the first kind of object receives the damage in accordance with the damage cause.

2. The video game processing apparatus according to claim 1, wherein the first kind of object information contains image information for displaying the first kind of object on the game screen and breakage information indicating a degree of breakage of the first kind of object,
 wherein the second kind of object information contains image information for displaying the second kind of object on the game screen and endurance information indicating a degree at which the second kind of object can endure the damage,
 wherein the damage specifier includes:
 a protection determiner that determines whether there is a relationship that the first kind of object protects the second kind of object against the damage cause on the basis of the state of the first kind of object;
 a first kind of damage specifier that specifies a first kind of damage in a case where the protection determiner determines that there is the relationship that the first kind of object protects the second kind of object, the first kind of damage indicating the damage that the first kind of object receives in accordance with the damage cause;

a second kind of damage specifier that specifies a second kind of damage in a case where the protection determiner determines that there is no relationship that the first kind of object protects the second kind of object, the second kind of damage indicating a damage that the second kind of object receives in accordance with the damage cause; and a state specifier that specifies the state of the first kind of object in the video game on the basis of the image information contained in the first kind of object information and the breakage information, and wherein the video game processing apparatus further comprises:

a breakage information updater that updates the breakage information on the basis of the first kind of damage among the damage specified by the damage specifier; and an endurance information updater that updates the endurance information on the basis of the second kind of damage among the damage specified by the damage specifier.

3. The video game processing apparatus according to claim 2, further comprising:

a battle impossible determiner that determines whether the multiple objects becomes a battle impossible state on the basis of the endurance information.

4. The video game processing apparatus according to claim 3, further comprising:

an image information updater that updates the image information contained in the first kind of object information so that an area of the second kind of object protected by the first kind of object becomes narrower in a case where the breakage information updater updates the breakage information so that the degree of breakage of the first kind of object is advanced, wherein the multiple object display controller changes a display form of the multiple objects on the basis of the image information after update in a case where the image information updater updates the image information contained in the first kind of object information.

5. The video game processing apparatus according to claim 3, wherein weak point information is associated with the second kind of object information, the weak point information containing image information for displaying a weak point object on the game screen and life information indicating a degree at which the weak point object can endure the damage, the weak point object indicating a weak point of the multiple objects, wherein the damage specifier includes a weak point damage specifier that specifies a weak point damage on the basis of the damage cause, the weak point information, and the state of the first kind of object, the weak point damage indicating a damage that the weak point object receives, wherein the video game processing apparatus further comprises:

a life information updater that updates the life information on the basis of the weak point damage specified by the weak point damage specifier, and wherein the battle impossible determiner determines whether the multiple objects are a battle impossible state on the basis of the life information in addition to the endurance information.

6. The video game processing apparatus according to claim 5, further comprising:

a battle impossible performance executor that carries out battle impossible performance in a case where the battle impossible determiner determines that the multiple objects becomes the battle impossible state, the battle impossible performance being defined in advance as performance carried out when the multiple objects become the battle impossible state, and wherein the battle impossible performance in a case where it is determined that the multiple objects becomes the battle impossible state on the basis of the endurance information is different from the battle impossible performance in a case where it is determined that the multiple objects becomes the battle impossible state on the basis of the life information.

7. The video game processing apparatus according to claim 1, wherein the damage cause specifier specifies a generation position of the damage cause and a path from the generation position toward the multiple objects, and wherein the protection determiner determines that the first kind of object has a relationship to protect the second kind of object in a case where the first kind of object is positioned on the path.

8. The video game processing apparatus according to claim 1, wherein the second kind of object is displayed in the video game on the game screen when the first kind of object is broken.

9. The video game processing apparatus according to claim 1, wherein a plurality of the multiple objects of the first kind of object cover one of the multiple objects of the second kind of object, and wherein the damage is distributed to the plurality of the multiple objects of the first kind of object in a random manner.

10. The video game processing apparatus according to claim 1, wherein a plurality of the multiple objects of the first kind of object cover one of the multiple objects of the second kind of object, and wherein the damage is distributed to the plurality of the multiple objects of the first kind of object in a random manner.

11. The video game processing apparatus according to claim 1, wherein a plurality of the multiple objects of the first kind of object cover one of the multiple objects of the second kind of object.

12. The video game processing apparatus according to claim 11, wherein the one of the multiple objects of the second kind of object is a continuous unit.

13. A non-transitory computer-readable medium including a video game processing program for controlling an operation of a video game processing apparatus, the video game processing apparatus controlling progress of the video game, the video game processing program causing the video game processing apparatus to execute:

displaying multiple objects on a game screen on the basis of multiple object information stored in a multiple object information memory, the multiple objects being constructed by a first kind of object and a second kind of object, first kind of object information being associated with second kind of object information in the multiple object information, the first kind of object information indicating information on the first kind of object, the second kind of object information indicating information on the second kind of object, the second kind of object being an object that is protected against a damage by means of the first kind of object;

specifying a damage cause, the damage cause indicating a cause of the damage that the multiple objects displayed in the displaying multiple objects on the game screen receives; and specifying at least the damage, which the second kind of object receives, on the basis of the damage cause specified in the specifying a damage cause and a state of the first kind of object in the video game, wherein the first kind of object is arranged to cover the second kind of object in the video game on the game screen, and the first kind of object has an appearance which changes in the video game on the game screen when the first kind of object receives the damage in accordance with the damage cause.

14. The non-transitory computer-readable medium according to claim 13, wherein the second kind of object is displayed in the video game on the game screen when the first kind of object is broken.

15. The non-transitory computer-readable medium according to claim 13, wherein a plurality of the multiple objects of the first kind of object cover one of the multiple objects of the second kind of object, and wherein the damage is distributed to the plurality of the multiple objects of the first kind of object in a random manner.

16. The non-transitory computer-readable medium according to claim 13, wherein a plurality of the multiple objects of the first kind of object cover one of the multiple objects of the second kind of object, and wherein the damage is distributed to the plurality of the multiple objects of the first kind of object in a random manner.

17. The non-transitory computer-readable medium according to claim 13, wherein a plurality of the multiple objects of the first kind of object cover one of the multiple objects of the second kind of object.

18. A video game processing apparatus for controlling progress of a video game, the video game processing apparatus comprising:

a multiple object information memory that stores multiple object information therein, first kind of object information being associated with second kind of object information in the multiple object information, the first kind of object information indicating information on a first kind of object, the second kind of object information indicating information on a second kind of object, the second kind of object being an object that is protected against a damage by means of the first kind of object;

a multiple object display controller that displays multiple objects on a game screen on the basis of the multiple object information stored in the multiple object information memory, the multiple objects being constructed by the first kind of object and the second kind of object;

a damage cause specifier that specifies a damage cause, the damage cause indicating a cause of the damage that the multiple objects displayed by the multiple object display controller receives;

a damage specifier that specifies at least the damage, which the second kind of object receives, on the basis of the damage cause specified by the damage cause specifier and a state of the first kind of object in the video game, the damage specifier including:

a protection determiner that determines whether there is a relationship that the first kind of object protects the second kind of object against the damage cause on the basis of the state of the first kind of object;

a first kind of damage specifier that specifies a first kind of damage in a case where the protection determiner determines that there is the relationship that the first kind of object protects the second kind of object, the first kind of damage indicating the damage that the first kind of object receives in accordance with the damage cause;

a second kind of damage specifier that specifies a second kind of damage in a case where the protection determiner determines that there is no relationship that the first kind of object protects the second kind of object, the second kind of damage indicating a damage that the second kind of object receives in accordance with the damage cause; and a state specifier that specifies the state of the first kind of object in the video game on the basis of the image information contained in the first kind of object information and the breakage information, and a breakage information updater that updates the breakage information on the basis of the first kind of damage among the damage specified by the damage specifier;

an endurance information updater that updates the endurance information on the basis of the second kind of damage among the damage specified by the damage specifier;

an image information updater that updates the image information contained in the first kind of object information so that an area of the second kind of object protected by the first kind of object becomes narrower in a case where the breakage information updater updates the breakage information so that the degree of breakage of the first kind of object is advanced;

a battle impossible determiner that determines whether the multiple objects becomes a battle impossible state on the basis of endurance information; and wherein the first kind of object information contains image information for displaying the first kind of object on the game screen and breakage information indicating degree of breakage of the first kind of object, wherein the second kind of object information contains image information for displaying the second kind of object on the game screen and the endurance information, the endurance information indicating a degree at which the second kind of object can endure the damage, and wherein the multiple object display controller changes a display form of the multiple objects on the basis of the image information after update in a case where the image information updater updates the image information contained in the first kind of object information.

19. The video game processing apparatus according to claim 18, wherein weak point information is associated with the second kind of object information, the weak point information containing image information for displaying a weak point object on the game screen and life information indicating a degree at which the weak point object can endure the damage, the weak point object indicating a weak point of the multiple objects, wherein the damage specifier includes a weak point damage specifier that specifies a weak point damage on the basis of the damage cause, the weak point information, and the state of the first kind of object, the weak point damage indicating a damage that the weak point object receives, wherein the video game processing apparatus further comprises:
- a life information updater that updates the life information on the basis of the weak point damage specified by the weak point damage specifier, and wherein the battle impossible determiner determines whether the multiple objects are a battle impossible state on the basis of the life information in addition to the endurance information.

20. The video game processing apparatus according to claim 19, further comprising:
- a battle impossible performance executor that carries out battle impossible performance in a case where the battle impossible determiner determines that the multiple objects becomes the battle impossible state, the battle impossible performance being defined in advance as performance carried out when the multiple objects become the battle impossible state, and wherein the battle impossible performance in a case where it is determined that the multiple objects becomes the battle impossible state on the basis of the endurance information is different from the battle impossible performance in a case where it is determined that the multiple objects becomes the battle impossible state on the basis of the life information.

* * * * *